April 14, 1931.  F. KLOPP  1,801,090
MACHINE FOR HARDENING THE BEARING POINTS OF DRIVING SHAFTS AND THE LIKE
Filed Feb. 28, 1929
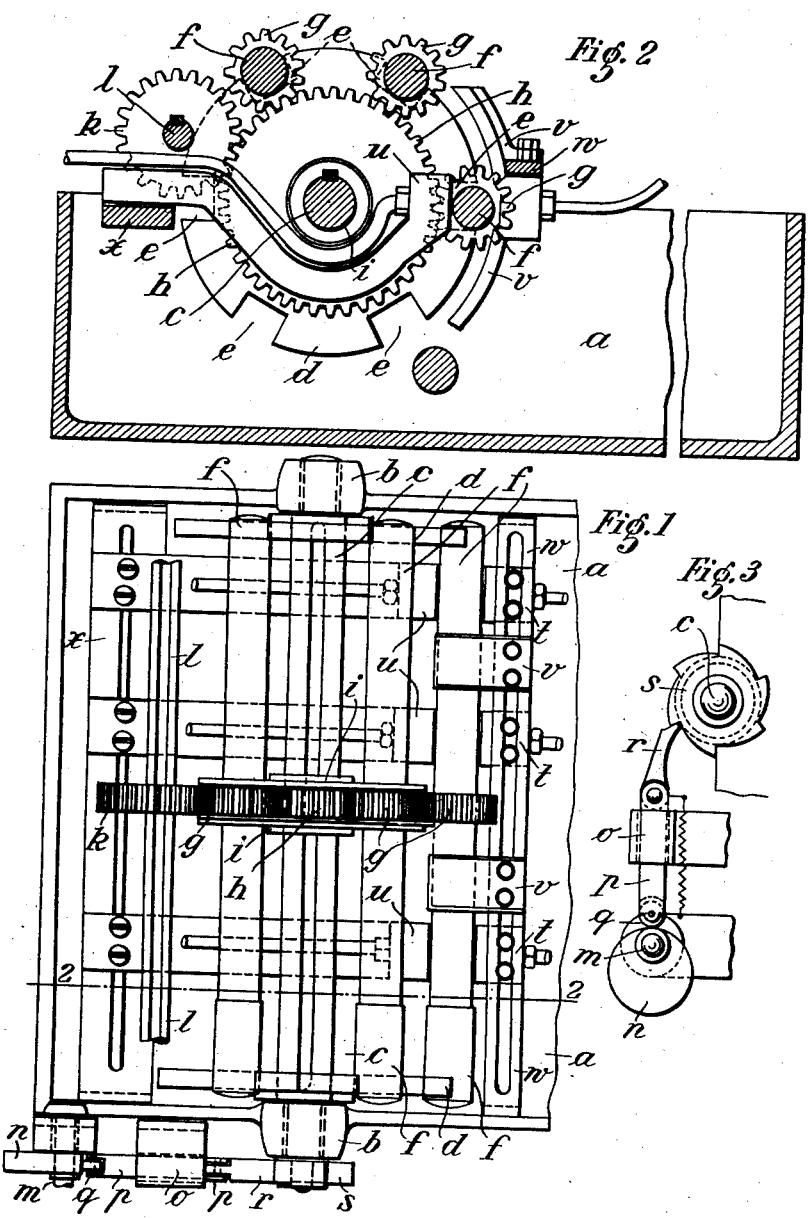

Patented Apr. 14, 1931

1,801,090

UNITED STATES PATENT OFFICE

FRIEDRICH KLOPP, OF WALD, GERMANY

MACHINE FOR HARDENING THE BEARING POINTS OF DRIVING SHAFTS AND THE LIKE

Application filed February 28, 1929. Serial No. 343,439.

This invention relates to a machine for hardening the journal- or bearing- surfaces of shafts, particularly driving shafts, in which the shafts are placed in open bearings of two end discs on a rotatable axle and their bearing surfaces to be hardened are conveyed past autogenous burners into the hardening liquid arranged thereunder.

The invention consists in that firstly a main axle carrying the end discs is rotated by a cam-actuated detent engaging periodically in a ratchet wheel keyed on the main axle and that further the shafts situated in the open bearings of the end discs are continually rotated owing to the fact that a spur wheel rigidly mounted thereon engages with a spur wheel loosely mounted on the main axle of the end discs and meshing with a driving spur wheel $k$. By this arrangement the shafts are brought consecutively at certain intervals with their bearing surfaces to be hardened within the range of autogenous burners and at the same time rotated continually whereby the bearing surfaces are heated all round, after which the shafts are dropped directly into the quenching tank.

An embodiment of the invention is illustrated by way of example in the accompanying drawing in which:
Fig. 1 shows the machine in top plan view.
Fig. 2 is a section on line 2, 2 of Fig. 1.
Fig. 3 shows in elevation a part of Fig. 1.
$a$ is the quenching tank. In bearings $b$ in the side walls of the tank an axle $c$ is journaled on which two end discs $d$ with open bearings $e$ are keyed. The shafts the bearing surfaces of which have to be hardened, are loosely placed from above into the open bearings $e$ in the end disc $d$. These shafts are designated by $f$. Prior to the inserting of the shafts $f$ into the open bearings $e$ of the end discs a spur wheel $g$ is keyed on each shaft, said spur wheels meshing with a spur wheel $h$, loosely mounted on a bush $i$ shiftable in longitudinal direction on the axle $c$.
A spur wheel $k$ shiftably mounted on an axle $l$ meshes with the spur wheel $h$. On an axle $m$ a cam $n$ is keyed. A roller $q$ in the end of a rod $p$ guided in a guide $o$ bears against the cam $n$. On the other end of rod $p$ a detent $r$ is hingedly fixed which engages with the ratchet wheel $s$ rigidly mounted on one of the axles $c$. Autogenous burners $t$ are shiftably mounted on a bridge $w$ and autogenous burners $u$ are shiftably mounted on a bridge $x$, said burners adapted to be secured in the adjusted position. The operation is as follows: When the axles $l$ and $m$ rotate, the spur wheel $k$ rotates the spur wheel $b$ which turns the spur wheel $g$ and with it the shafts $f$. The cam $n$ actuates periodically the ratchet wheel $s$ and through the same the axle $c$ so that the shafts $f$ are brought in succession between the rows of autogenous burners $t$, $u$ where the surfaces to be hardened are heated. At the next following rotation of axle $c$ the shaft $f$, which has just been heated, drops into the quenching tank $a$ and the next following shaft is brought into the range of the burners $t$, $u$. Stops $v$ shiftably mounted on the bridge $w$ and adapted to be adjusted serve to prevent the shaft $f$ from prematurely dropping out of the open bearings $e$ of the end discs $d$ into the quenching tank.

I claim:—

1. Machine for hardening the bearing surfaces of driving shafts, comprising in combination with a quenching tank and two rows of autogenous burners mounted in said tank above the quenching liquid, an axle journaled in the side walls of said tank, two discs keyed on the ends of said axle each disc having open bearings adapted to receive the shafts to be hardened, means for periodically rotating said axle and bringing said shaft successively between said two rows of autogenous burners, and means for rotating the shaft actually being heated between said autogenous burners, said shaft dropping out of the open bearings into the quenching liquid at the next following part rotation of said axle.

2. In a machine as specified in claim 1, in combination with the driving axle and the discs on the same, the means for rotating shafts to be hardened, consisting of a spur wheel keyed on each of said shafts to be hardened, a bush on said axle, a spur wheel loosely mounted on said bush meshing with each of the spur wheels on said shafts, and a driving gear wheel for rotating said loose spur wheel.

In testimony whereof I affix my signature.

FRIEDRICH KLOPP.